(12) United States Patent
Bajrach

(10) Patent No.: US 8,285,654 B2
(45) Date of Patent: Oct. 9, 2012

(54) METHOD AND SYSTEM OF PROVIDING A PERSONALIZED PERFORMANCE

(76) Inventor: Nathan Bajrach, Rosh Haayin (IL)

( * ) Notice: Subject to any disclaimer, the term of this patent is extended or adjusted under 35 U.S.C. 154(b) by 821 days.

(21) Appl. No.: 12/305,555

(22) PCT Filed: Jun. 21, 2007

(86) PCT No.: PCT/IL2007/000757
§ 371 (c)(1), (2), (4) Date: Dec. 18, 2008

(87) PCT Pub. No.: WO2008/001350
PCT Pub. Date: Jan. 3, 2008

(65) Prior Publication Data
US 2009/0254836 A1 Oct. 8, 2009

Related U.S. Application Data

(60) Provisional application No. 60/817,074, filed on Jun. 29, 2006.

(51) Int. Cl.
*G06F 15/18* (2006.01)

(52) U.S. Cl. ......................................................... 706/14

(58) Field of Classification Search ........................ None
See application file for complete search history.

(56) References Cited

U.S. PATENT DOCUMENTS

| | | |
|---|---|---|
| 5,309,359 A | 5/1994 | Katz et al. |
| 5,404,295 A | 4/1995 | Katz et al. |
| 5,884,302 A | 3/1999 | Ho |
| 5,977,968 A | 11/1999 | Le Blanc |
| 5,987,415 A | 11/1999 | Breese et al. |
| 6,064,854 A | 5/2000 | Peters et al. |
| 6,314,410 B1 | 11/2001 | Tackett et al. |
| 6,418,440 B1 | 7/2002 | Kuo et al. |
| 6,430,602 B1 | 8/2002 | Kay et al. |

(Continued)

FOREIGN PATENT DOCUMENTS

CN 1366258 A 8/2002

(Continued)

OTHER PUBLICATIONS

'Enhancing conversational flexibility in multimodal interactions with embodied lifelike agents': Mori, IUI' Jan. 2003/03, ACM 1-58113-586-6, pp. 270-272.*

(Continued)

*Primary Examiner* — Omar Fernandez Rivas
*Assistant Examiner* — Peter Coughlan
(74) *Attorney, Agent, or Firm* — Oliff & Berridge, PLC

(57) ABSTRACT

A computer for use with a system capable of providing a personalized performance of a story having a predefined timeline and a method of operating the system. The method comprises receiving inputs from users; analyzing at least said received inputs in order to recognize actual input components; matching said actual input components to a set of predefined input components; modifying the story timeline in accordance with results of said matching; and generating the performance in accordance with the modified story timeline. The technique may be used, for example, for personalized presentation; message positioning and persuasion application; simulated teacher performance application; performance and business indicators analysis application; simulated tour guide application; simulated hostess application; self-introduction related application; dating services related application; blog service and navigation application; social and networking service application; public relations and promotional services application; entertainment application; medical and health care services application; customer support services application, etc.

41 Claims, 7 Drawing Sheets

U.S. PATENT DOCUMENTS

| | | |
|---|---|---|
| 6,501,966 B1 | 12/2002 | Bareis et al. |
| 6,721,706 B1 | 4/2004 | Strubbe et al. |
| 6,728,679 B1 | 4/2004 | Strubbe et al. |
| 6,731,307 B1 | 5/2004 | Strubbe et al. |
| 6,773,344 B1 | 8/2004 | Gabai et al. |
| 6,795,808 B1 | 9/2004 | Strubbe et al. |
| 6,907,113 B1 | 6/2005 | Holm et al. |
| 2002/0005865 A1* | 1/2002 | Hayes-Roth ............... 345/706 |
| 2002/0049795 A1 | 4/2002 | Freeman |
| 2002/0059045 A1 | 5/2002 | Tackett et al. |
| 2002/0187463 A1 | 12/2002 | Aspe et al. |
| 2003/0143517 A1 | 7/2003 | Norcott et al. |
| 2003/0174160 A1 | 9/2003 | Deutscher et al. |
| 2004/0138959 A1 | 7/2004 | Hlavac et al. |
| 2004/0205131 A1 | 10/2004 | Saruhashi et al. |
| 2004/0205515 A1* | 10/2004 | Socolow et al. .......... 715/501.1 |
| 2004/0233200 A1 | 11/2004 | Karren |
| 2005/0154594 A1 | 7/2005 | Beck |
| 2005/0211768 A1 | 9/2005 | Stillman |
| 2005/0235198 A1 | 10/2005 | Howard et al. |
| 2005/0282140 A1* | 12/2005 | Knight ........................ 434/365 |
| 2006/0031115 A1* | 2/2006 | Eisma et al. ................... 705/11 |
| 2006/0069546 A1* | 3/2006 | Rosser et al. ..................... 704/9 |
| 2006/0085182 A1 | 4/2006 | Eves et al. |
| 2007/0118801 A1* | 5/2007 | Harshbarger et al. ......... 715/730 |

FOREIGN PATENT DOCUMENTS

| | | |
|---|---|---|
| JP | A-10-214024 | 8/1998 |
| WO | WO 02/42973 A1 | 5/2002 |
| WO | WO 2005/122526 A1 | 12/2005 |

OTHER PUBLICATIONS

'User Friendly, Interactive Software Successfully Trains WOrkers in Safety': Eisma, Occupational Health & Safety, May 1991, vol. 60, pp. 30-36.*

* cited by examiner

METHOD AND SYSTEM OF PROVIDING A PERSONALIZED PERFORMANCE

FIELD OF THE INVENTION

This invention relates to methods and systems capable of personalized performance and applications thereof.

BACKGROUND OF THE INVENTION

Nowadays a personalized performance (e.g. simulating interaction as, for example, conversation, with a user to create an impression of a human presence, interactive educating presentations, etc.) is used for entertainment, marketing, education, medical and other purposes. Problems related to personalized performance have been recognized in prior art and various systems have been developed to provide a solution, for example:

U.S. Pat. No. 5,309,359 (Katz et al.) entitled "Method and apparatus for generating and utilizing annotations to facilitate computer text retrieval" discloses a method and apparatus for computer text retrieval which involves annotating at least selected text subdivisions, preferably with natural language questions, assertions or noun phrases. However, the annotations may also initially be generated in a structured form. Annotations are, if required, converted to a structured form and are stored in that form. Searching for relevant text subdivisions involves entering a query in natural language or structured form, converting natural language queries to structured form, matching the structured form query against stored annotations and retrieving text subdivisions connected to the matched annotations. The annotation process may be aided by utilizing various techniques for automatically or semi-automatically generating the annotations.

U.S. Pat. No. 5,884,302 (Ho) entitled "System and method to answer a question" discloses a database-processing method and system for answering a natural-language question by a computer system with a database. In one embodiment, the system analyzes the grammatical structure of the question. In the analysis, the system scans the question to extract each word in the question; then based on a pre-defined context-free grammatical structure, the question is parsed into its grammatical components using one or more grammar rules and the database. After parsing the question, the system transforms the components into one or more instructions, using one or more semantic rules and the database. The instructions, when executed, at least access data from the database for generating the answer to the natural-language question. In another embodiment, the system compares the natural-language question with questions stored in the database; each question in the database has its corresponding answer. If there is a match, the system retrieves the answer to the corresponding matched question and presents the answer to the student.

U.S. Pat. No. 6,314,410 (Tackett et al) entitled "System and method for identifying the context of a statement made to a virtual robot" discloses an automated interface program designed to interact and communicate with users, said program executing actions when a category among a predefined set of categories is activated. Also the patent discloses a method for interpreting the context of a user input, the steps of said method comprising: associating subjects with categories; maintaining a list of the subjects associated with the most recently activated category; testing conditions in categories such that the condition is true if comprises at least one subject in common with said list of subjects; and activating a set of categories, said set comprising those categories whose conditions are satisfied based on the list of subjects.

U.S. Pat. No. 6,418,440 (Kuo et al.) entitled "System and method for performing automated dynamic dialogue generation" discloses a method and apparatus for generating a human-machine dialogue comprising steps or modules for receiving a user request comprising at least one topic of interest; retrieving from an external database at a first point in time, a first set of documents comprising information relating to the at least one topic of interest; generating a human-machine dialogue based on the information comprised in said first set of documents; retrieving from the external database at a second point in time later than said first point in time, a second set of documents comprising information relating to the at least one topic of interest, the information comprised in said second set of documents having at least one difference from the information comprised in said first set of documents; and modifying the human-machine dialogue based on the information comprised in said second set of documents.

U.S. Pat. No. 6,430,602 (Hoffer et al.) entitled "Method and system for interactively responding to instant messaging requests" discloses a method and system for interactively responding to queries from a remotely located user, the system including a computer server configured to receiving an instant message query or request from the user over the Internet. The query or request is interpreted and appropriate action is taken, such as accessing a local or remote data resource and formulating an answer to the user's query. The answer is formatted as appropriate and returned to the user as an instant message or via another route specified by the user. A method and system of providing authenticated access to a given web page via instant messaging is also disclosed.

U.S. Pat. No. 6,721,706 (Strubbe et al) entitled "Environment-responsive user interface/entertainment device that simulates personal interaction" discloses an interaction simulator, such as a chatterbot, enabled to simulate an awareness of the user to generate an interaction. For example, the device may employ machine vision to detect the number of persons present or the activity of the user and respond accordingly by interrupting its output or by inviting a conversation or other interaction when a user approaches. The device may modify its responses according to the user's activity, for example, by playing music when the user falls asleep or requesting an introduction when another user speaks. The device may also respond to unrecognized changes in the situation by inquiring about what is going on to stimulate interaction or generate new responses.

U.S. Pat. No. 6,728,679 (Strubbe et al.) entitled "Self-updating user interface/entertainment device that simulates personal interaction" discloses an interaction simulator having the ability to dynamically update response templates and response data by retrieving current information from a data source. The interaction simulator may interact verbally or by other means such as gesture, typed text, or other means to generate a "dialogue". The criteria used to create new response data can come from fixed specifications, for example, the current weather, or from the content of previous conversations (for example, the system creating a new template about a topic indicated by the user to be of interest to him/her).

U.S. Pat. No. 6,731,307 (Strubbe et al.) entitled "User interface/entertainment device that simulates personal interaction and responds to user's mental state and/or personality" discloses an interaction simulator using computer vision, and inputs of other modalities, to analyze the user's mental state and/or personality. The mental state and/or personality are classified, and this information is used to guide conversation and other interaction. In a chatterbot embodiment, the substance of the conversation may be altered in response to the mental state and/or personality class, for example, by changing the topic of conversation to a favorite subject when the user is sad or by telling a joke when the user is in a good mood.

U.S. Pat. No. 6,773,344 (Freeman et al.) entitled "Methods and apparatus for integrating interactive toys with interactive television and cellular communication systems" discloses interactive toys having real time conversations with users, preferably employing speech recognition. Interactive toys are preferably connected to at least one interactive toy server which is preferably connected to entertainment, education, sales promotion and other content providers possibly via Internet communication systems. Interactive toys further utilize user knowledge bases to match entertainment, education and sales promotion content to user histories, behaviors and habits. Content is thus personalized to an individual user as well as to a user's environment including the user's location and the time at which the toy is used. Integration of content, such as entertainment, education and sales promotion is provided by merging interactive television techniques with interactive toys.

U.S. Pat. No. 6,795,808 (Tackett et al.) entitled "User interface/entertainment device that simulates personal interaction and charges external database with relevant data" discloses an interaction simulator, such as a chatterbot, connected with an external database, such as an electronic program guide. The information gathered during interaction, particularly conversational, is parsed and used to augment the database data. The interaction simulator may be guided by the data residing in the database so as to help fill in recognizable gaps by, for example, intermittently asking questions relating to the subject data requirement. The interaction simulator may be provided with specific response templates based on the needs of the database and a corresponding set of templates to extract the information required by the database. Another example database may be for recording and indexing by key word stories or other free-form verbal data uttered by the user. The interaction simulator may be programmed to help the user develop the story using templates designed for this purpose.

US Patent Application 2002/59,045 (Tackett et al.) entitled "System and method for automatically focusing the attention of a virtual robot interacting with users" discloses a method for automatically verifying the performance of an automated interface program, the steps of said method comprising: specifying inputs under which the program should be tested; associating said inputs with conditions within categories in the program, each said condition comprising at least one response which could be given if said condition is satisfied; executing said program under at least one said input; determining whether the associated condition is satisfied upon said input; and determining whether the response associated with said condition is given upon said input. In another aspect of the present invention, the test inputs are embedded within the script itself, and specifically, within categories that can be automatically listed upon compilation of the script. Such a list of test inputs can then be automatically executed to test the program. The execution of a test input can be used to check whether the test input activated the category in which the test input is embedded. The response given upon execution of a test input can then determine whether other categories are erroneously activated; or whether inputs, other than the test input, erroneously activate the category associated with the test input US Patent Application No. 2004/138,959 (Saruchashi et al.) entitled "Artificial intelligence platform" discloses a platform for authoring and deploying interactive characters powered by artificial intelligence. The platform permits the creation of a virtual world populated by multiple characters and objects, interacting with one another so as to create a life-like virtual world and interacting with a user so as to provide a more interesting and powerful experience for the user. This system can be used for entertainment purposes, for commercial purposes, for educational purposes, etc.

US Patent Application No. 2004/205,131 discloses an information communication service system in which multimedia contents such as moving images, still images, and text are registered in advance and are fetched when required with holding bidirectional conversation functions using multimedia information including TV pictures and sounds for providing conferences, education, medical care, nursing care, various consultations, and the like. The information communication service system comprises: a bidirectional communication server for conducting bidirectional multimedia communication; a contents management server for storing multimedia contents; and a contents delivery server for delivering the contents stored in the contents management server to user terminals. The contents management server has a contents archiver storing material contents, and performs delivery based on a scenario which defines a combination of material contents along the time axis. The bidirectional communication server also has a data conference function and a chat function. A resource management function and an accounting function are also provided.

International Application No. WO 2002/42,973 (Kang et al.) entitled "Apparatus and method for materializing interactive cyber seminar" discloses an apparatus and method able to perform an interactive multimedia presentation using realistic images and voices on the basis of a virtual reality modeling language (VRML), which is a virtual reality materialization tool. This apparatus comprises a seminar server for executing a certain mode to allow a publisher and listener to interactively participate in a multimedia seminar, a chatting server for providing chatting information in response to live data from the seminar server, a Web broad server for running a Web board in response to on-demand data from the seminar server, a media streaming server for providing media streaming data to the seminar server, and a database for storing personal information and seminar information of the listener and publisher. Web-cast images and voices can be utilized as interactive commodity, education, seminar and presentation data.

International Application No. WO 2005/122,526 (Suner) entitled "Interactive mobile on-line visual information and entertainment service" discloses a method of providing interactive, mobile, on-line, visual, information and entertainment service. For this purpose, the user accesses to a broadcast provided by a service or a contents provider over a mobile communications network. This broadcast is on pre-determined subjects and comprises live or pre-recorded, vocal or silent, motion pictures. The user gains access to this broadcast through his/her mobile communication device, e.g. mobile phone, and gains information, acquires education, benefits from consultancy, entertains, does business/shopping, etc., by choosing among said images, and by providing oral, visual and/or written interaction with the said motion pictures and/or the person on the broadcast, within the framework of a protocol determined by the service or the contents provider or depending on his/her own preferences.

SUMMARY OF THE INVENTION

In accordance with certain aspects of the present invention, there is provided a computer for use in a system capable of providing a personalized performance of at least one story having a predefined timeline. The computer supports at least one user interface configured to facilitate an interaction of one or more users with the computer, said interaction comprising receiving one or more inputs from the users and facilitating providing the performance thereof. The computer is configured to modify the story timeline in accordance with one or more received inputs, to generate a performance in accordance with the modified story timeline, and to facilitate providing said generated performance to the user via the user interface.

In accordance with further aspects of the present invention, the computer further comprises a user database with information related to one or more users and/or users' group, said information related to at least one subject selected from a group comprising: general personal information, demographic details, user profile, personal preferences, mood at certain time, attitude at certain time, historical information, statistical information. The computer is further configured to analyze inputs received from a certain user in respect to certain timeline, define one or more indicators of user's communication style and/or one or more attributes characterizing user's personality, and to update the user database accordingly. The computer is further configured to modify the predefined timeline for a certain user in accordance with information comprised in the user database and related to said user.

In accordance with further aspects of the present invention, the computer further comprises a media library containing one or more media items to be used when generating the performance of the story and/or a scripts library containing at least one or more scripts and/or one or more story boards related to one or more episodes of one or more stories.

In accordance with further aspects of the present invention, the computer further comprises a components library with a set of predefined input components. The computer is further configured to modify the set of predefined input components based on data previously obtained during interacting with one or more users.

In accordance with further aspects of the present invention, the computer further comprises an input analysis unit operatively coupled with the components library and configured to parse one or more received user's inputs, recognize one or more components comprised in said inputs, thus giving rise to actual input components, and to match said actual input components to the predefined input components. The computer further comprises an event details records unit operatively coupled with the input analysis unit and configured to receive data and/or derivatives thereof from the input analysis unit for accommodation, wherein the event detail records comprise at least data related to matching between actual and predefined input components. The event details records may comprises subjects related to at least one of the following: user inputs and/or derivatives thereof; user related information; context information comprising position in the story timeline, media item currently presented to the user and/or currently activated script/story.

In accordance with further aspects of the present invention, the computer further comprises a controller unit operatively coupled with the events details records unit and configured to receive data from the events details records unit and to select one or more appropriate actions in accordance with certain rules. The computer further comprises an output manager configured to communicate with the controller unit and generate the performance in the actions selected by the controller unit and communicated to the output manager.

In accordance with other aspects of the present invention, there is provided a method of operating a system capable of providing a personalized performance of a story having a predefined timeline. The method comprises:
    receiving one or more inputs from one or more users;
    analyzing at least said received inputs in order to recognize one or more components comprised in said inputs thus giving rise to actual input components;
    matching said actual input components to a set of predefined input components;
    modifying the story timeline in accordance with results of said matching; and
    generating the performance in accordance with the modified story timeline.

In accordance with further aspects of the present invention, the recognition is provided by segmenting the received inputs and matching the resulting segments to one or more predefined potential components. The method further comprises recording said matched predefined input components in one or more fields of an event details record; analyzing said event details record in order to define if data in one or more certain fields or combinations thereof matches a certain criterion; and modifying the story timeline in a case of positive match.

In accordance with further aspects of the present invention, the method further comprises analyzing inputs received from a certain user in respect to certain timeline; defining one or more indicators of a user's communication style and/or one or more attributes characterizing user's personality, and modifying said certain timeline in accordance with the results. The method further comprises obtaining information related to a certain user and/or users' group, said information related to at least one subject selected from a group comprising: general personal information, demographic details, user profile, personal preferences, mood at certain time, attitude at certain time, historical information, and statistical information, and modifying the timeline for a certain user in accordance with said information.

In accordance with further aspects of the present invention, the received user's inputs may comprise, for example, text input, audio input, video input, speech input, image input, information related to predefined elements of the user interface, mood characteristics, and/or attitude characteristics. The provided performance may comprise such outputs at least text output, audio output, video output, speech output, image output, etc.

In accordance with other aspects of the present invention, the computer and the method may be used for different applications as, for example, personalized presentation, message positioning and persuasion application, simulated teacher performance application, performance and business indicators analysis application, simulated tour guide application, simulated hostess application, self-introduction related application, dating services related application, blog service and navigation application, social and networking service application, public relations and promotional services application, entertainment application, medical and health care services application, and/or customer support services application.

In accordance with other aspects of the present invention, there is provided a method of operating a system capable of performing a persuasion related story having a predefined timeline. The method comprises:
    receiving one or more inputs from one or more users;
    analyzing at least said received inputs in order to recognize one or more components comprised in said inputs thus giving rise to actual input components;
    matching said actual input components to a set of predefined input components;
    modifying the story timeline in accordance with results of said matching;

generating the performance in accordance with the modified story timeline.

The story may be related to different subjects as, for example, communication with a politician, promotion of certain product, education, traveling, self-introduction, social networking, entertainment, customers service, health care service and/or public relationship.

In accordance with other aspects of the present invention, the data related, at least, to user inputs with respect to respective context are recording for further analyzes. The analysis may provide, for example, one or more indicators of efficiency of the persuasion.

Among advantages provided in accordance with certain aspects of the present invention is avoiding a need for large databases of templates and responses; enabling personalization of interaction based on one or more user's inputs, user profile, current context and/or behavior during an operational session.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
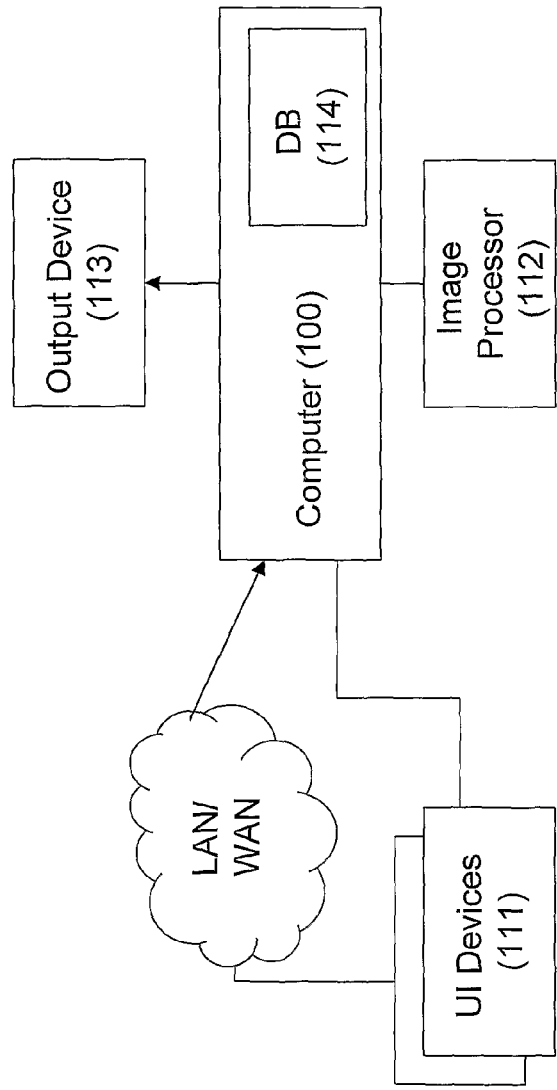
FIG. 1 illustrates a generalized diagram of an interaction simulator as known in the art.

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention. In the drawings and descriptions, identical reference numerals indicate those components that are common to different embodiments, configurations and/or presentations.

Unless specifically stated otherwise, as apparent from the following discussions, it is appreciated that throughout the specification discussions utilizing terms such as "processing", "computing", "calculating", "determining", "generating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including optical disks, CD-ROMs, flash memory (e.g. Disk-on-Key), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The references cited in the background teach many principles of simulation of personal interaction that are applicable to the present invention. Therefore the full contents of these publications are incorporated by reference herein where appropriate for appropriate teachings of additional or alternative details, features and/or technical background.

The term "criterion" used in this patent specification should be expansively construed to cover any compound criterion, including, for example, several criteria and/or their combination.

The term "story" used in this patent specification should be expansively construed to cover any piece of fiction that narrates a chain of related episodes that lead to an outcome which is of value to certain audiences. The episodes may contain one or more media items (e.g. text, video, audio, animation, movie, web pages or parts thereof, etc.). The sequence of episodes and media items within episodes is defined by a story timeline.

The term "performance" used in this patent specification should be expansively construed to cover any way of presenting one or more episodes of the story in accordance with an original or modified story timeline.

Bearing this in mind, attention is drawn to FIG. 1, illustrating a generalized diagram of a conversation (interaction) simulator as known in the art and described, for example, in U.S. Pat. No. 6,721,706. The conversation (interaction) simulator is a non-limiting example of a system capable to provide a personalized performance. The interaction simulator operates as a software tool running on a computer 100. The computer 100 may receive different inputs from various sources for example, via user interface devices 111, an image processor 112 connected to cameras, etc. The inputs may include printed text, gestures, remote controls, eye movement, body position, sounds, etc. The inputs may be gathered by the computer 100 directly, through local or wide area (including Internet) networks, etc. The computer 100 may facilitate output through an output device 113 with, for example, displaying and audio capabilities. The input and output devices are operatively coupled to the computer (optionally, some of them may constitute a part of the computer). The computer 100 comprises a database 114 containing statement templates and pre-defined responses linked to said templates. Typically, the interaction simulators do not comprise a story with pre-defined timeline, and one simulator differs from another by size and variability of its database of templates and responses. The computer is configured to match the user's inputs (statements) against the stored templates, choose a template that "best" (e.g. with the highest ranking) matches a user's statement and produces one of the template's associated responses. The templates can comprise single words, combinations of words, or phrases. A single template can include alternative and/or alternatively spelled words or phrases and/or comprise or be linked to a synonym dictionary. Words or phrases in the templates can be marked for necessary inclusion or exclusion. If a word or phrase is matched for exclusion, then there is no match on this particular template when this word or phrase is present. Furthermore, a template can have a variable. For example, the "Do you like (X)" template has a variable as its fourth term. The variable can be passed on to the response, e.g., "No, I don't like X". In this case all the words after "Do you like" would be bound to the variable.

Some of conversation simulators known in the art (e.g. disclosed in U.S. Pat. No. 5,884,302) may use computational linguistics enabling parsing sentences and identifying, for example, the most important words, direct object, verb, etc. to be used during the template matching process.

Some prior art conversation simulators may be responsive to human emotions and/or personality, e.g. by user's explicit indicating of the mood/personality/attitude via the user interface, by biometrical sensing, by using effective computing technology as described, for example, in U.S. Pat. No. 5,987,415, by video input, etc. The process of templates matching and selection of appropriate response among predefined responses may depend on the user's mood and/or personality, e.g. response templates may be provided with vectors indicating the appropriateness of the template to the various mood.

Figure 2:
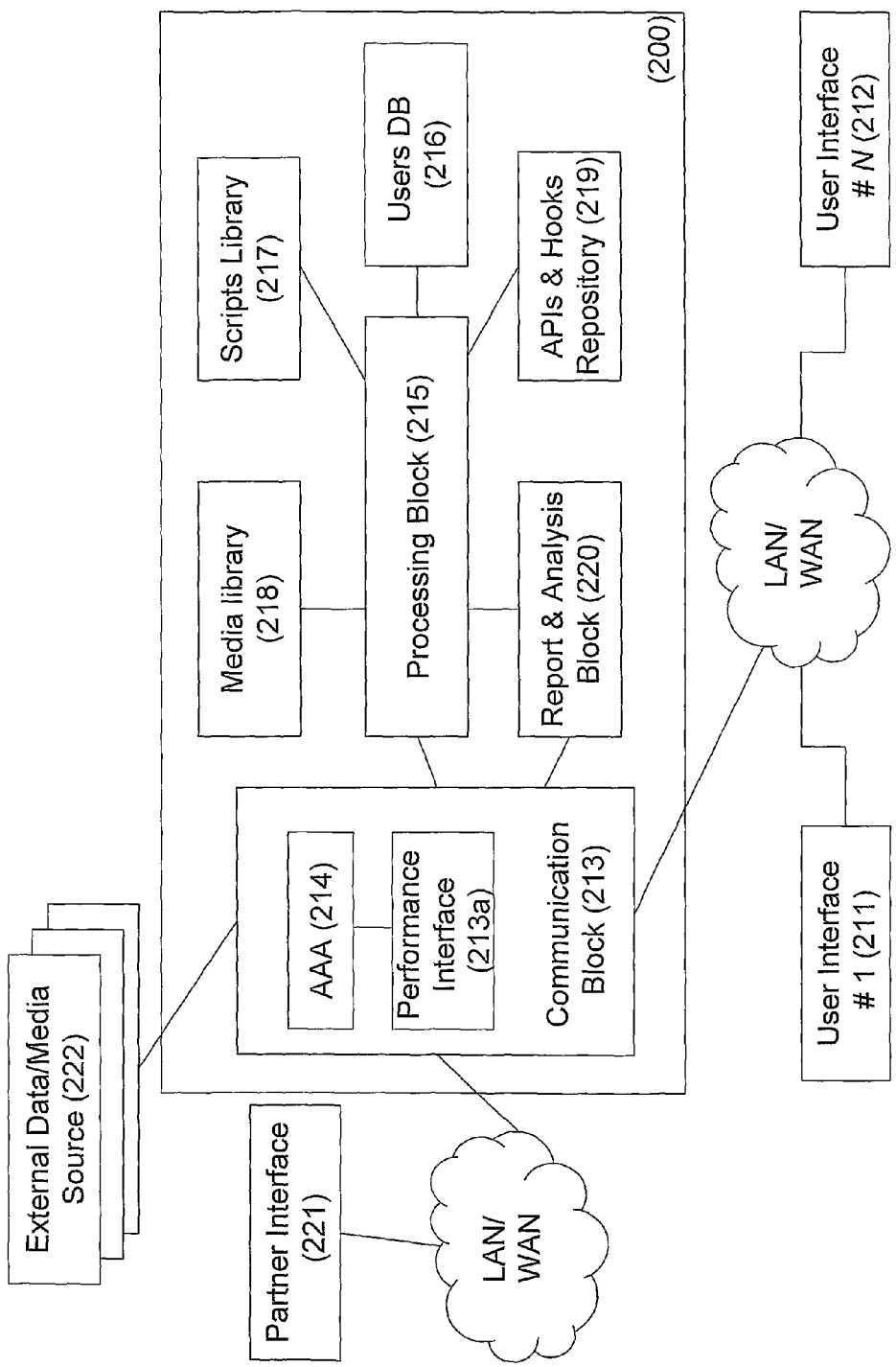
FIG. 2 illustrates a generalized diagram of a system capable of providing a personalized performance in accordance with certain embodiments of the present invention.

Referring to FIG. 2, there is schematically illustrated a generalized diagram of a system capable of providing a personalized performance in accordance with certain embodiments of the present invention. The system comprises one or more user interfaces (211, 212) operatively coupled to a computer 200 (optionally, constituting a part thereof). The user interface is operatively associated with any communication device having input and output capabilities and capable to communicate with the computer 200. The communication devices include fixed and cellular phones, personal and other computers, pagers, dedicated data units (e.g. PDA), TV set-up boxes, digital media centers, etc. The communication device may communicate with the computer 200 directly or indirectly via all possible networks such as, for example, Wireline or Wireless Public Telephone Networks, Internet, Intranet, cable network, etc.). The communication may comprise voice, data, video, multimedia, electronic messaging (e.g. SMS, SMS, e-mail, instant messaging, etc.) and/or other communications in different formats and/or combinations thereof. In certain embodiments of the present invention the user interface may be configured as a client or as a web-browser, or may be directly associated with the computer 200. In certain embodiments of the invention the user interface (at least part of input and/or output capabilities) may be split between several communication devices. The inputs and outputs of the user interface may include the entire range of inputs and outputs that could be used to create interaction between a user and a machine, e.g. typed text, speech, sounds, video, biometric data, movements, etc.

The computer 200 may be a single and/or stand-alone computer or its functionality may be distributed among several different computers running several applications. In certain embodiments of the present invention the computer 200 may be configured as a host or as a web server. The illustrated system may be configured to provide a personalized performance autonomously and/or as a part of a service provided by a service provider.

In accordance with certain embodiments of the present invention, the computer 200 is configured to generate at least one output story or parts thereof (e.g. in a form of live performance, presentation, story telling) in accordance with a predefined timeline, to manage the story timeline in accordance with inputs received via one or more user interfaces and to facilitate the corresponding story output via one or more user interfaces. The computer 200 contains a communication block 213 operatively coupled with a processing block 215. The communication block comprises performance interface 213a configured to receive inputs sent via one or more user interfaces and to communicate them to the processing block, as well as to communicate outputs generated by the processing block to the user interfaces. The performance interface is further configured to facilitate input/output operation by an administrator and/or service provider. The performance interface is further detailed with reference to FIG. 7.

The communication block may comprise an AAA (authentication, authorization and accounting) unit 214 operatively coupled with the performance interface. The AAA unit performs at least part of the following functions:

authenticating users at the start of the session, e.g. by interface with 3rd party authentication means. Authentication can be performed by ID, username/password, biometrics, magnetic cards, RFID cards, etc.;

assigning user roles and permissions which will limit use of the system;

producing accounting data to be used by external systems for billing (e.g. per message, per session, per session duration, per content, etc.) of the user and/or 3rd parties.

The computer 200 further contains one or more data repositories operatively coupled with the processing block 215, for example, a users' database 216, a scripts library 217, a media library 218, an APIs and hooks repository 219, etc. The processing block 215 provides necessary processing and management of data received by the computer 200 and/or stored in the data repositories. The processor executes calculations and data management necessary for the personalized performance process in accordance with the present invention. In certain embodiments of the invention the processing functionality may be distributed between various processing components connected directly or indirectly; or/and a part of said calculations and/or data management may be executed by external systems or by other blocks of the computer 200.

The users' database 216 contains personal information about users (e.g. name, address, demographic details, etc.). The database may also contain information about personal preferences, current mood/attitude as well as historical and statistical information related to a specific user and/or users' group.

The media library 218 contains various media items (e.g. video footage, digital animations, text, audio files, web pages, books, magazines, etc.) to be used when generating the performance of a story or parts thereof. The scripts library 217 comprises original story timeline as well as scripts and/or story boards related to one or more episodes or parts thereof.

In accordance with certain embodiments of the invention the story timeline is prepared in advance and modified by the system during the operational session in accordance with one or more inputs from one or more users and/or other user related information. In certain embodiments of the invention the scripts and/or story boards are prepared in advance by a content developer. In other embodiments at least part of them may be modified during the session (and/or later) with a help of adapting and/or optimizing algorithms based on historical and/or statistical data related to interaction with one or more users.

The API & hooks repository 219 comprises API & hooks facilitating integration with different means for extension of the system or operation thereof (e.g. external blocks provided by $3^{rd}$ parties, customized system blocks, etc.)

In certain embodiments of the invention the data repositories may include a history database (not shown in FIG. 2) comprising one or more full records (and/or parts and/or derivatives thereof) of interactions with one or more users.

The data stored in the data repositories may be updated in push and/or pull modes; per request of the computer 200 (or operator) or automatically (in real/near real time, per pre-defined event, per time schedule, etc.) One or more data repositories may also store data or derivatives thereof received from one or more external sources 222 (e.g. $3^{rd}$ parties' databases/libraries, Internet sites, etc.) via, for example, the performance interface in the communication block 213. For example, the media library 218 and/or the script library 217 may comprise, respectively, default media and/or default scripts provided by a service provider operating the system as a part of its service. One or more data repositories may also comprise algorithms, programs and criteria for optimization of at least part of the interaction simulating process, including algorithms for adaptive optimization based on historical and/or statistical data.

The computer 200 may be configured to analyze the data and/or derivatives thereof received during the performance or aspects thereof (e.g. to provide analysis of data stored in the history database, real time analysis of performance details, etc.). The data may be analyzed for purposes related to the system operation (e.g. identifying bugs and dead ends in a story timeline to be repaired, modifying/optimizing episodes and/or story timeline, auto-ranking suggestions, e.g., most frequent comments, queries, questions by users at each stage of the session, etc.) as well as to variety of business purposes (e.g. to create key performance and business indicators, trends, profiles, etc.; to measure the efficiency and trends for current messages; create new story or parts thereof, etc.). In certain embodiments of the invention the system is capable of analyzing the data to determine indicators of users communication styles, defining attributes characterizing user's personality, and accordingly updating the user's profile.

For example, the following Table 1 provided by GST Telecom (see http://www.cedanet.com/meta/communication_styles.htm "Communication Styles Table by GST Telecom") illustrates non-limiting example of relationship between user's personality and data received during interaction with the user.

TABLE 1

| FACTORS: | EXPRESSER | DRIVER | RELATER | ANALYTICAL |
| --- | --- | --- | --- | --- |
| How to Recognize: | They get excited | They like their own way; decisive & strong viewpoints | They like positive attention, to be helpful & to be regarded warmly | They seek a lot of data, ask many questions, behave methodically & systematically |
| Tends to Ask: | Who? (the personal dominant question) | What (the results oriented question.) | Why? (the personal non-goal question.) | How? (the technical analytical question.) |
| What They Dislike: | Boring explanations/ wasting time with too many facts. | Someone wasting their time trying to decide for them. | Rejection, treated impersonally, uncaring & unfeeling attitudes | Making an error, being unprepared, spontaneity |
| Reacts to Pressure and Tension By: | "Selling" their ideas or arguments | Taking charge, taking more control | Becoming silent, withdrawn, introspective | Seeking more data & information |
| Best way to Deal With: | Get excited with them. Show emotion | Let them be in charge | Be supportive; show you care. | Provide lots of data & information |
| Likes To Be Measured By: | Applause, feedback, recognition | Results, Goal-oriented | Friends, close relationships | Activity & being busy that leads to results |
| Must Be Allowed To: | Get ahead quickly. Likes challenges | Get into a competitive situation. Likes to win | Relax, feel, care, know you care. | Make decisions at own pace, not cornered or pressured. |
| Will Improve With: | Recognition & some structure with which to reach the goal | A position that requires cooperation with others | A structure of goals & methods for achieving each goal | Interpersonal and communication skills |
| Likes to Save: | Effort - they rely heavily on hunches, intuition, feelings | Time - They like to be efficient, get things done now | Relationships - Friendship means a lot to them | Face -. They hate to make an error, be wrong or get caught without enough info |
| For Best Results: | Inspire them to bigger & better accomplishments | Allow them freedom to do things their own way | Care & provide detail, specific plans & activities to be accomplished | Structure a framework or "track" to follow |

The algorithms and programs for analysis and evaluation of the obtained results as well as results and/or derivatives thereof are stored in a report and analysis block 220 operatively coupled with the processing block 215. The report and analysis block may also comprise programs and templates for generating reports. The block 220 may be further operatively coupled with the communication block 213 further configured to facilitate 3$^{rd}$ party communication with the computer 200 and/or access to at least part of results and/or reports comprised in the block 220 (e.g. via partner interface 221).

Those skilled in the art will readily appreciate that the invention is not bound by the configuration of FIG. 2; equivalent functionality may be consolidated or divided in another manner. In different embodiments of the invention, connection between the blocks and within the blocks may be implemented directly or remotely. The connection may be provided via Wire-line, Wireless, cable, Voice over IP, Internet, Intranet, or other networks, using any communication standard, system and/or protocol and variants or evolution thereof.

Figure 3:
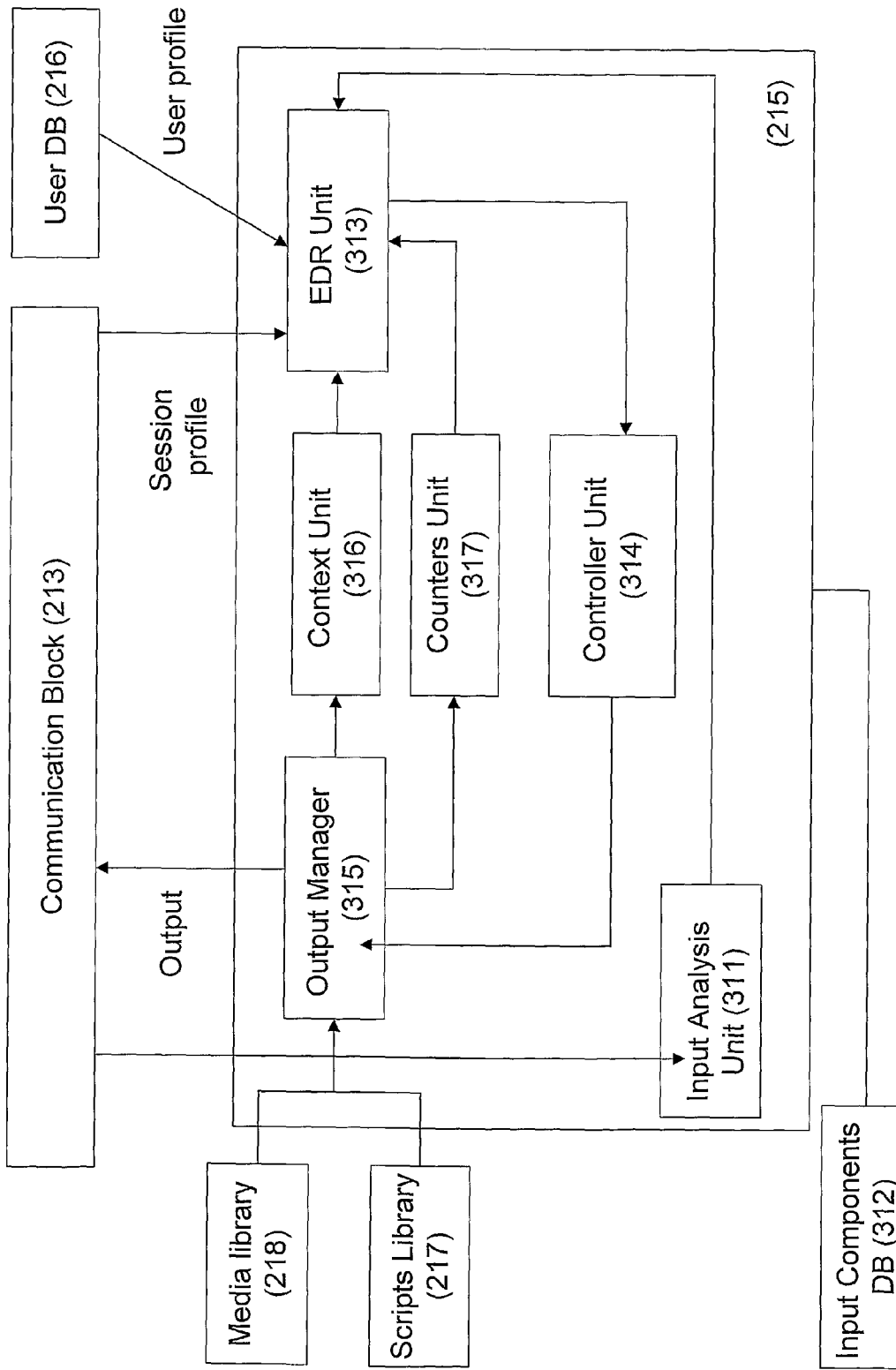
FIG. 3 illustrates a generalized diagram of a processing block of the system capable of simulating a personal interaction in accordance with certain embodiments of the present invention.

Referring to FIG. 3, there is illustrated a generalized diagram of the processing block 215 in accordance with certain embodiments of the present invention.

The processing block is operatively coupled with an input components library 312 and comprises an input analysis unit 311 configured to analyze inputs received via one or more user interfaces. In accordance with certain embodiments of the invention, the library 312 comprises a set of predefined input components (referred to hereinafter as system-defined components), e.g. prepared in advance by a system developer. In some embodiments at least part of the set may be modified with a help of adapting and/or optimizing algorithms based on historical and/or statistical data related to interaction with one or more users. The library 312 is created in accordance with Zipf law stipulating that although there are a limitless number of natural inputs possible, a finite list of input components can cover a very high percentage of actual human inputs (see, for example, W. Li, "Random texts exhibit Zipfs-law-like word frequency distribution", IEEE Transactions on Information Theory, 38(6), pp. 1842-1845, 1992). The system-defined input components to be stored in the library 312 may be selected in accordance with a predefined story among entire range of input components, could be used to create interaction between a user and a machine, and to be further adjusted per user audience, purpose of performance, etc. The input analysis unit 311 is configured to parse the received input, recognize one or more actual input components and to match them to the system-defined input components stored in the library 312.

The following non-limiting example describes the recognition and matching the input components in a case of a natural language input. The process includes syntax analysis for reformatting the text and getting rid of syntax errors; parsing the text and recognizing input components (segments) in the received natural language input; and matching the segments into system-defined input components stored in the library:

System-defined input components stored in the library 312:
[Hello], [I am telling you my name], [I am talking about myself how are you], [I am waving], [I am walking away], [What is your name], [Where do you live], [Tell me more about you], [Yes], [No].
Input Text:
Hello my name is Nathan, how are u today :-)
Syntax:
hello my name is nathan how are you today smile Segments:
[hello] [my name] [name] [me] [question] [how are you] [time] [today]
Matched system-defined input components:
[hello] [I am telling you my name] [I am talking about myself] [general question] [how are you].

In certain embodiments of the invention a set of potential segments may be predefined, and the recognition may be provided by matching the input components with the segments among the set. For example, the set of potential segments comprises: [hello], [my name], [name], [me], [question], [how are you], [time], [today], etc. These segments are recognized in the user text input as following:
[hello]: Hi, hello, what's up, good morning, bonjour
[my name]: my name, I am called
[name]: name
[me]: me, I, myself
[question]: what, how, when, why, are you, is it, can you, can i
[how are you]: how are you
[time]: time, now, yesterday, tomorrow, today
[today]: now, today Matching the segments into system-defined input components may be provided in accordance with pre-defined rules. For example, the creator of a performance may assign to each input component the associated segments to be matched, e.g.:
Segment: [Hello] assigned to system-defined input components: [hello]
Segment: [my name]-assigned to system-defined input components: [I am telling you my name]
Segment: [name] [me]-assigned to system-defined input components: [I am telling you my name]

Alternatively, the creator of a performance may provide one or more samples of text associated with each input component. For example:
Input components: [hello] has samples: Hi, Hello to you, Good morning dear friend
Input components: [I am telling you my name] has sample: My name is Nathan, You can call me Nathan, I'm called Nathan The system will further analyze the sample text and determine the most appropriate segments for each input component. This process may be done as follows:

The system assigns a weight to each segment based on the frequency of the segment across all samples of all input components. A more frequent segment means it is not indicative of a specific input component (as it appears in many samples) and it will get a lower weight (examples of such segments are [me] [you] [question]); whereas a segment that appears only in the samples of a specific input component will get a high weight.

For each input component, the system analyses the samples and determines the segment that were matched. The system then selects three most frequent segments for that specific input component as the ones that represent it. In case another input component has the same 3 segments representing it, additional segments 4, 5, or 6 will be selected as well.

The analysis of audio and/or video inputs may be provided in a similar manner after processing the received audio and/or video inputs into the text. The speech recognition engine, image analyzer and/or similar blocks may be a part of the unit interface, a part of the input analysis unit or be implemented in a separate block (external or constituting a part of the system). The non-text elements of received video input may also be matched to the system-defined input components (e.g. person walks by, walks away, sits down, stands up, waves hand, jumps, more than one person, wears glasses, etc.). System-defined input components may be also associated with buttons (e.g. yes, no, more, options), scroll bars (e.g. scrolling mood-bars happy-nothappy, ilike-idontlike) and other elements of the user interface. Audio recognition may include 'mood detectors' algorithms providing information such as, for example, stress levels. Image recognition may include 'face reading' algorithms providing information about the person's character based on facial features. In certain embodiments of the invention audio and/or video recognition and/or parts thereof may be provided by $3^{rd}$ parties.

Those skilled in the art will readily appreciate that the invention is not bound by the above matching process, the recognition of input components and/or following matching to the system-defined input components may be provided based on matching templates, using wildcard, statistical engines, data mining, etc.

The processing block 200 further comprises:
- an EDR (Event Details Record) unit 313 operatively coupled with the input analysis unit 311;
- a controller unit 314 operatively coupled with the EDR unit; and
- an output manager 315 operatively coupled with the controller unit 314 and, optionally, with the EDR unit via a context unit 316 and/or a counter unit 317.

The EDR unit is configured to store and manage at least part of data and/or derivatives thereof received from the input analysis unit. In certain embodiments of the invention the EDR unit may be further configured to store and manage data and/or derivatives thereof received from the counter and the context units, session profile data and/or derivatives thereof (e.g. received from the communication block 213), user profile data and/or derivatives thereof (e.g. received from the user database 216, external source, from the user via user's interface, etc.), etc. In addition to the matched system-defined input components, the event detailed record may contain at least part of the following:
- user inputs and/or derivatives thereof (e.g. recognized segments in the printed text);
- user related information (received from user database, external data source(s), user interface other sources; and/or further updated based on data gathered during the interaction process);
- context information comprising position in the story timeline, media item currently presented to the user and/or currently activated script/story;
- session related data;
- data received from the counters unit.

The following table illustrates a non-limiting example of an event details record:

| | |
|---|---|
| Input Text: | Hello my name is Nathan, how are u today :-) |
| Syntax: | hello my name is nathan how are you today smile |
| Video recognition: | [wave hand] |
| Recognized input components: | [hello] [my name] [name] [me] [question] [how are you] [time] [today] |
| Matched system-defined input components: | [hello] [I am telling you my name] [I am talking about myself] [general question] [how are you] |
| User Profile: | Male, 20-35, 'driver' communication style |
| Session Details: | start time, duration, # of inputs, last input, etc., type and/or address of the input device, etc. |
| Context: | [it=...] [they=...] [yes=...] [no=...] ... |
| Counters: | [hello=1] [how are you=0] ... |

The controller unit 314 is configured to receive data from the EDR unit and to select an appropriate action based on matching the EDR against a set of rules and advanced analysis algorithms. The controller may run one or more analysis engines, including, for example, generic rules engine (e.g. filters, aggregations, distinct, concatenations and other types of rules); dedicated pattern detectors, engines based on data mining algorithms (e.g. regression tree, neural networks, clustering, etc.), scoring mechanism engine, etc. For example, the controller may be configured to run a filtering engine with prioritized multiple rules configured as logical conditions (e.g. to activate a corresponding action if data in a certain field (or combination thereof) of EDR matches a certain criterion). The criterion may be predefined, generated and or modified by the system as a result of data mining among historical and/or statistical data, etc.

Each rule has one or more actions assigned to it. Selection among these actions may be provided in different ways, e.g. randomly, randomly with minimal repeating, context-aware, per user preferences, etc. The assigned actions include story timeline related actions (e.g. switch to a new script, a new sub-presentation, program; insert new media item, insert new script, etc.), user related actions (e.g. update user profile, update input components library, etc.), operation related actions (e.g. facilitate user's action through APIs and Hooks, etc.) and others. Non-limiting examples of rules and associated actions are further illustrated with reference to FIG. 6.

The output manager is 315 configured to generate the performance in accordance with original or modified story timeline. The output manager is configured to communicate (in pull and/or push mode) with the controller unit 314; to get appropriate scripts from the scripts library 217 and/or media items from the media library 218, and/or to provide other actions in accordance with action activation data received from the control unit, and to generate, modify and/or manage the performance and to facilitate its output to be provided to the user via the user interface. Modification may include, for example, inserting and/or replacing episodes in the story timeline, replacing media items within an episode, etc.

The counter unit 317 is operatively coupled with the output manager and with the EDR unit, and configured to keep counters on the usage of certain media items and to provide this data or derivatives thereof to the EDR unit, e.g. in order to avoid unnecessary repetition of the same media item.

The context unit 316 is operatively coupled with the output manager and with the EDR unit, and configured to extract context information (e.g. position in the story timeline, media item currently presented to the user, currently activated script/story, etc.) and provide at least part of this data or derivatives thereof to the EDR unit.

Figure 5:
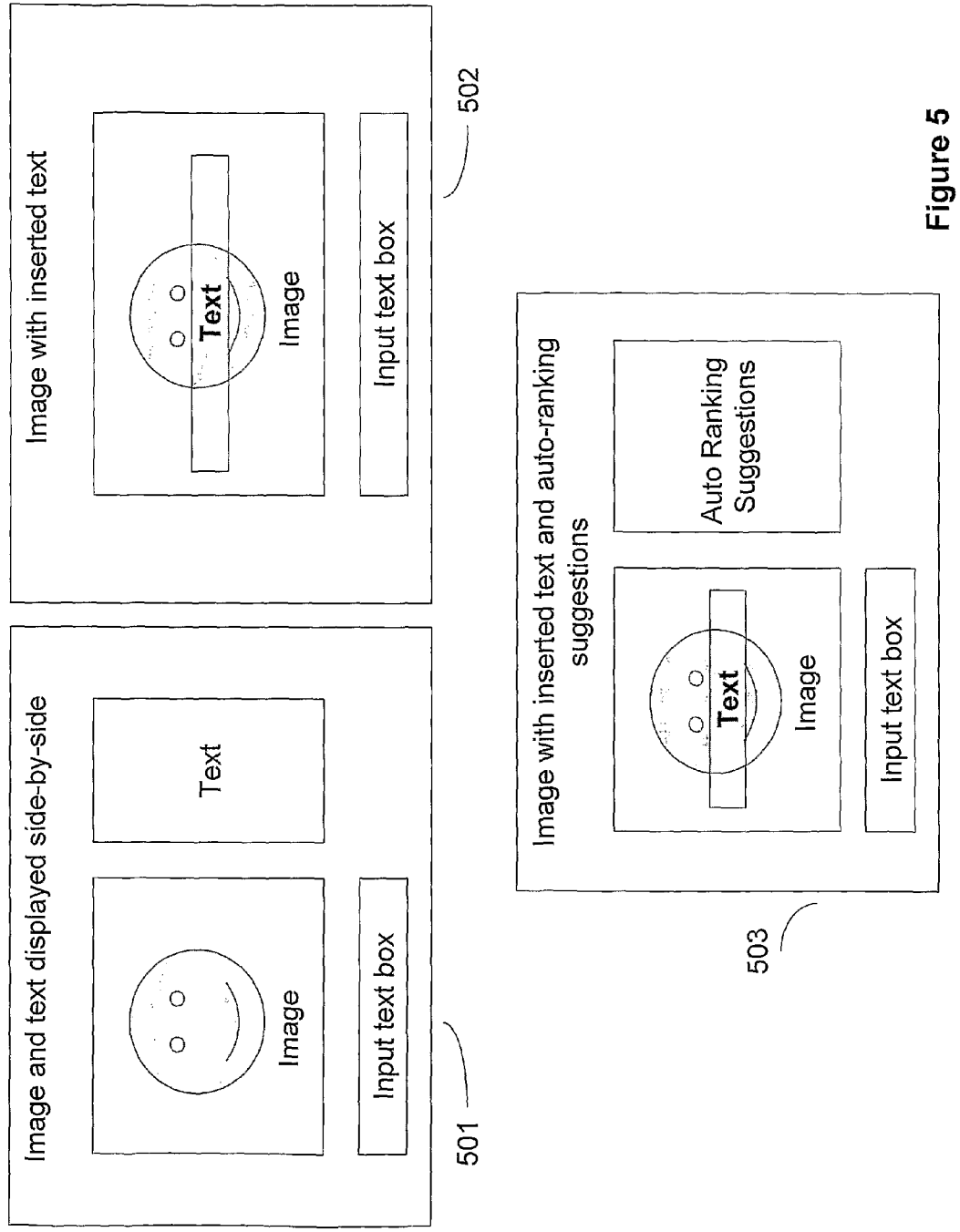
FIG. 5 illustrates non-limiting examples of presenting different media items to the user.

The performance generation may include, for example, preparing the performance comprising movies, text, pop-ups or any other media item in accordance with original or modified story timeline. Different media items may be presented to the user in various configurations. FIG. 5 illustrates, by way of non-limiting example, configuration 501 wherein text and image are presented on a display side-by-side; configuration 502, wherein the text is inserted within the image; and configuration 503 wherein presentation also includes auto-ranking suggestions.

The auto-ranking suggestions show input components that are most popular with other users or were configured by the creator as "featured/suggested" inputs. These may be suggested inputs in general, or suggested inputs for that specific part of the story timeline, or suggested inputs that include keywords the user has already typed in the textbox (e.g. dynamic textbox), or suggested inputs according to users with similar interests or profile, etc. Suggested inputs will have a great impact on the user experience, as a user can choose between selecting a suggested input or typing free text.

Input components: [hello] has samples: Hi, Hello to you, Good morning dear friend When the user types: "H", "He", or "Hel" the textbox may already show suggested input "Hello to you".

If the user selects "Hello to You" the system will determine that the input component is [hello]

If the user decides to follow on "Hel" by typing free text "Hello world!" the system will evaluate this free text entry with segments and match to input component [hello]

Those skilled in the art will readily appreciate that the invention is not bound by the configuration of FIG. 3; equivalent functionality may be consolidated or divided in another manner.

Figure 4:
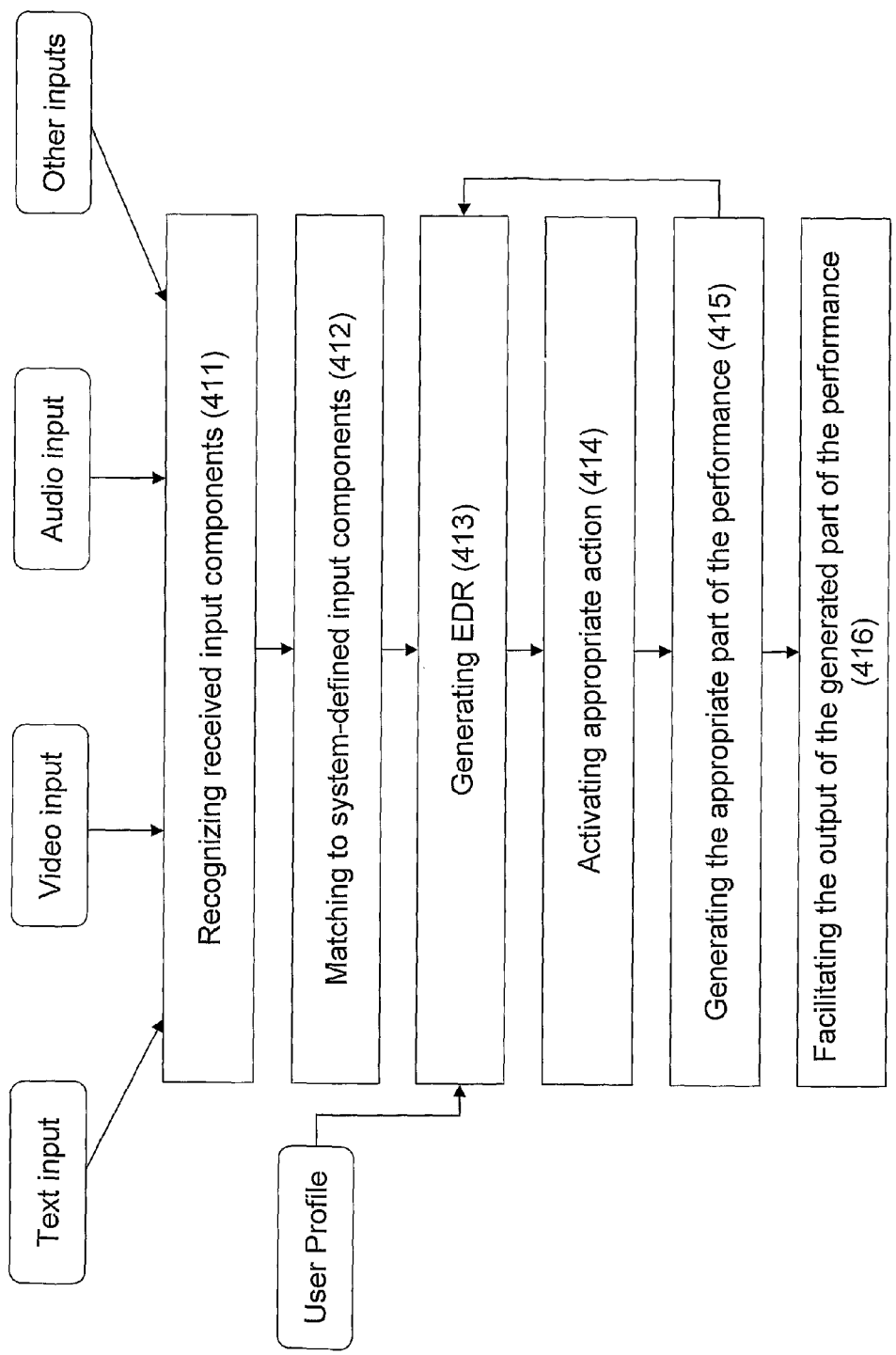
FIG. 4 illustrates a generalized flow diagram showing the principal operations of the system capable of providing a personalized performance in accordance with certain embodiments of the present invention.

Referring to FIG. 4, there is illustrated a generalized flow diagram showing the principal operations of the system capable of providing a personalized performance in accordance with certain embodiments of the invention. The operation may be started by a user input, or the system may provide performance in accordance with an original story timeline, or in accordance with a story timeline modified in a previous session with the identified user or another users. One or more substantially concurrently received inputs from the user (e.g. video input, text input, audio input, etc.) are analyzed 411 in order to recognize the input components. The recognized input components are matched 412 to the system-defined input components and the matched system-defined components are recorded 413 in the EDR.

As was described with reference to FIG. 3, the EDR may also comprise additional information as, for example, related to user profile, session, story context, etc. The EDR is analyzed in order to define if data in one or more certain fields or combinations thereof matches a certain criterion, and, accordingly, one or more appropriate actions are activated 414. This results in generating an appropriate part of the performance 415 and facilitating 416 its output to the user.

Figure 6A:
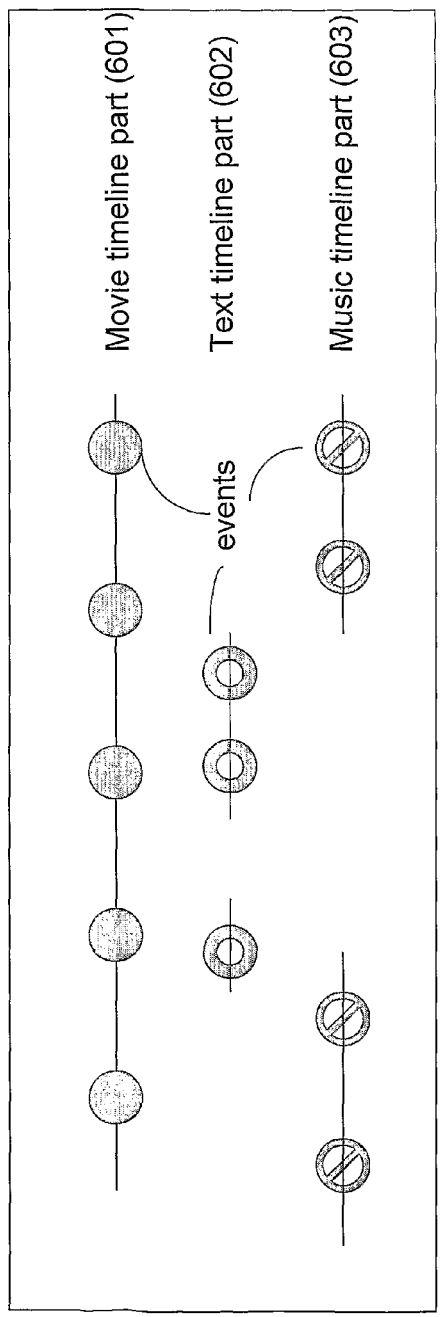
FIGS. 6a and 6b illustrate a non-limiting example of a story timeline (FIG. 6a) and its modification (FIG. 6b) in accordance with certain embodiments of the present invention.
Figure 6B:
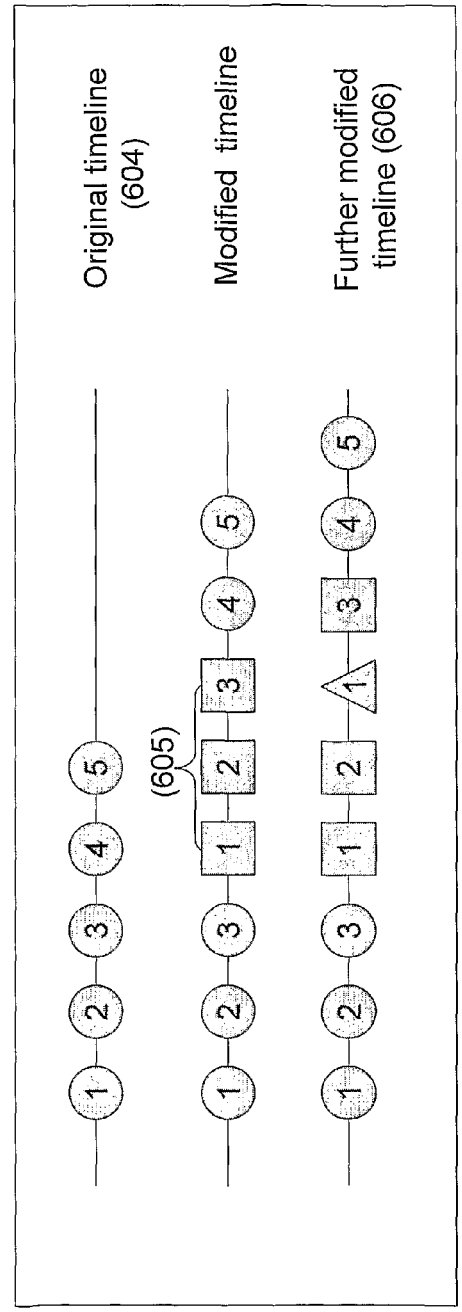

Referring to FIGS. 6a and 6b, there are illustrated non-limited examples of a story timeline (FIG. 6a) and its modification (FIG. 6b) in accordance with certain embodiments of the present invention. As illustrated in FIG. 6a, the story timeline may be divided into several parts, for example in accordance with type of episodes (e.g. per type of media items as illustrated by movie part 601, text part 602, and music part 603), user or user group, levels of interaction, etc. In certain embodiments of the invention is each part of the story timeline may be managed in a separate way. As illustrated in FIG. 6b, the original story timeline 604 is modified by inserting episodes 605 and further inserting episode 606 in accordance with user inputs as was described with reference to FIGS. 3 and 4.

The story and its components (e.g. timeline, media and script libraries, input component libraries, assigned actions, rules of their selection, etc.) depend on the topic and the purpose of the story. Following are non-limiting examples of implementation of certain aspects of the present invention for personalized performance of a speech of a politician.

For example, a presidential candidate holds press conferences when he wants to address the public. Many people would like to talk with him, ask him questions, and so forth. There already is a presidential campaign web site where people can find information. However no one expects that the presidential candidate will spend his days chatting on the Internet. In accordance with certain aspects of the present invention, personalized performance may be deployed to allow the politician to personally present his views and agenda. It may further enable to adapt messages targeted to the specific audience in order to be more personal and optimize the levels of persuasion; while at the same time enable visitors to provide comments on it, request to see information about specific issues of interest to them, ask a question, or just tell the presidential candidate what they have on their minds.

Among advantages of certain aspects is greater impact of the messages put forth to the audience, resulting in higher popularity than through traditional messaging campaigns, tools for campaign managers for gathering data related to political indicators, trends and projections estimation, etc.

The outputs of the user interface include video display (e.g. used to show a politician's speech), add-on text display (e.g. to show commentary details), etc. The inputs of the user interface include user textbox (e.g. for inputs by visitors in the form of comments, questions, etc.), user feedback buttons 'Applause' and 'Boo' for providing instant feedback on displayed messages, etc. The user interface may further include:

auto-ranking suggested inputs feedback form for visitors to leave posts/comments that will be reviewed by the campaign manager;

contact details;

articles, pictures, links;

other Web Site elements.

The media and script libraries may include the following content:

Video Topic "The Future": the candidate's statements about the future in the following episodes:

Episode 1: General views of the future

Episode 2: Investment for the future in simple terms

Episode 3: Investment for the future in global terms

Episode 4: Investment for the future in local terms

Episode 5: Investment for the future in social terms

Episode 6: Investment for the future in patriotic terms

Episode 7: Partnering with the candidate in simple terms

Episode 8: Partnering with the candidate in global terms

Episode 9: Partnering with the candidate in local terms

Episode 10: Partnering with the candidate in social terms

Episode 11: Partnering with the candidate in patriotic terms

More episodes . . .

Video Topic "Fighting poverty"

Episode 12; Status on poverty in general terms

Episode 13: Status on poverty in life values terms

Episode 14: Status on poverty in detailed terms

Episode 15: Status on poverty in urban terms

Episode 16: Status on poverty in non-urban terms

Episode 17: Challenges facing the country in general terms

Episode 18: Challenges facing the country in life values terms

Episode 19: Challenges facing the country in detailed terms

Episode 20: Challenges facing the country in urban terms

Episode 21: Challenges facing the country in non-urban terms

Episode 22: Meeting the challenges in general terms

Episode 23: Meeting the challenges in life values terms

Episode 24: Meeting the challenges in detailed terms

Episode 25: Meeting the challenges in urban terms

Episode 26: Meeting the challenges in non-urban terms

Episode 27: Results and the way ahead in general terms

Episode 28: Results and the way ahead in life values terms

Episode 29: Results and the way ahead in detailed terms

Episode 30: Results and the way ahead in urban terms
Episode 31: Results and the way ahead in non-urban terms
More episodes . . .
Video Topic "Maintaining Security"
  Episode 32: Status on security in general terms
  Episode 33: Status on security in life values terms
  Episode 34: Status on security in detailed terms
  Episode 35: Status on security in urban terms
  Episode 36: Status on security in non-urban terms
  Episode 37: Challenges facing the country in general terms
  Episode 38: Challenges facing the country in life values terms
  Episode 39: Challenges facing the country in detailed terms
  Episode 40: Challenges facing the country in urban terms
  Episode 41: Challenges facing the country in non-urban terms
  Episodes . . . Meeting the challenges in various terms
  Episodes . . . Current results and way ahead in various terms
  More episodes . . .
Video Topic "Boosting the Economy"
  Episodes . . . Status on economy in various terms
Episodes . . . Challenges facing the country in various terms
  Episodes . . . Meeting the challenges in various terms
  Episodes . . . Current results and way ahead in various terms
  More episodes . . .
More Video Topics . . . More Episodes . . .
Textual Facts to answer common questions
  Fact 1: Age and date of birth
  Fact 2: Years in office
  Fact 3: Family details
  Fact 4: School
  More facts . . .
Conversational video clip displaying typical human gesture/conversation skills
  Clip 1: Candidate smiles to acknowledge user input
  Clip 2: Candidate says "I like you"
  Clip 3: Candidate laughs
  Clip 4: Candidate says "no thanks"
  Clip 5: Candidate says "Yeah sure"
  More Video Conversation clips . . .

The scripts can define several original timelines in accordance with a topic, for example:
  Script default speech: Episodes 1, 2, 7, 12, 17, 22, 27, 32, 37, . . .
  Script patriotic speech: Episodes 11, 8, 6, 3, 32, 38, . . .
  Script social speech: Episodes 13, 18, 23, 28, 9, 10, 11 . . .
  Script the future, the patriotic version: 3, 5, 6, 8, 9, 11 . . .
  Script the future, the social version: 5, 4, 9, 8 . . .
  More Scripts . . .

The input components library comprises the following input components and combinations thereof:
  [advice] [aids] [american football] [animals] [army] [bad] [basketball] [books] [booze] [boy] [car] [come close] [coming] [computer] [cool] [country] [crazy] [dirtytalk] [disbelieve] [do not like] [economy] [fake] [family] [favorite] [food] [future] [general question] [girl] [good] [goodbye] [happiness] [happy] [happy holidays] [hello] [help] [how to] [i am] [i do not know] [i do not like you] [i have] [i like you] [i want] [i want to talk to] [i want to visit you] [interjection] [joke] [jump kneel turn] [kiss] [love] [luxury] [me] [merry christmas] [money] [movies] [my favorite] [my home] [my name] [need] [no] [now] [number] [peace] [pictures] [politics] [religion] [repeat] [rock and roll] [sad] [school] [security] [show me] [sick] [sing] [smoking] [soccer] [sports] [stars] [stop] [suggest] [tell me] [terrorism] [unknown] [war] [weather] [well done] [who are you] [yes] [your age] [your favorite] [your home]
  [general question] [goodbye] [hello] [hello happy holidays] [help] [how to find information] [i am happy] [i am sad] [i am sick] [i am talking about me] [i am talking about my family] [i am talking about my friends] [i am talking about politics] [i am talking about sports] [i am talking about terrorism] [i am talking about the army] [i am talking about the future] [i am talking about unknown] [i am talking about poverty] [i am talking about money] [i am talking dirty] [i am telling you my name] [i am telling you where i live] [i do not know] [i do not like you] [i have been bad] [i have been good] [i like you] [i want to ask something] [i want to visit you] [i want unknown] [i want you to come close] [i want you to run in circles] [interjection] [money] [no] [tell me a joke] [tell me about unknown] [tell me about you] [tell me about your home] [tell me about your life] [tell me how old are you] [tell me what are you doing now] [tell me what do you want to do] [tell me what is your favorite food] [tell me what is your favorite movie] [tell me what is your favorite toy] [tell me what is your religion] [tell me who is your favorite star] [what do you like] [what do you not like] [what do you not like] [yes]

The following are non-limited examples of several Use Cases demonstrating some Rules and Actions:

a) Use case "simple rule": Visitor is playing along and enters questions that are well structured and relevant to the applications; for instance 'What do you do to fight poverty', 'How do you see the future'.
  Example of a rule: to activate action "performing script on poverty, the default version" if EDR contains input component [i am talking about poverty]. Accordingly, the performance is generated in accordance with the original timeline corresponding to this script.
  Example of a rule: to activate action "performing script on the future, the default version" if EDR contains input component [i am talking about the future]. Accordingly, the performance is generated in accordance with the original timeline corresponding to this script.

b) Use case "context information": questions or comments such as 'How will you fight it' or 'tell me more about it' that are mapped based on context information to 'What do you do to fight poverty?'
  Example of a rule: to activate action "insert into the timeline episodes per script on poverty, the detailed version" if EDR contains input component [how to] and context value [poverty]. Accordingly, the performance in generated in accordance with the modified timeline.

c) Use case "simple rule": the user enters general comments or fuzzy questions such as 'you are the man', 'we believe in you', which are mapped to 'how do you see the future'.
  Example of a rule: to activate action "insert into the timeline episodes per script the future, the patriotic version" if EDR contains input component [I like you]

d) Use case "session information": the user enters and re-paste text containing the same input components, e.g. 'poverty', 'terror', 'war'. Here the first time input component 'poverty' triggers the original timeline per script on fighting poverty. Repeated input component 'poverty' while the current session's timeline is showing the relevant script should not change the current script or restart it, just insert and acknowledge and continue with the performance per original timeline.

Example of a rule: to activate action "insert into the timeline the clip #1 where the candidate smiles to acknowledge user input" and continue per corresponding timeline if EDR contains input component [poverty], context information [script=poverty] and counters information [number of [poverty] more than 1].

e) Use case "simple rule": the user enters a question deserving an accurate answer, e.g. 'how old are you'. The direct answer is displayed in the form of text fact on the side of display, without disturbing the current video.

Example of a rule: to activate action "display text fact #1, comprising age and date of birth" if EDR contains input component [how old are you]

f) Use case "simple rule": the user enters a conversational question or comment such as 'are you really that smart', 'whatever', 'what's that all about', etc. The system will insert a conversational video clip and return to the original timeline.

Example of a rule: to activate action "insert into the timeline clip #1" if EDR containing input component [interjection]

g) Use case "user-related information": the profile information (e.g. location, age, sex, communication style, etc.) may be accessed through external databases, forms filled in by the user, generated by the system or otherwise. This user-related information is used by certain rules resulting in different scripts (and episodes) being used.

Example of a rule: activate actions matching condition [age>20 and age<45] and modify respectively the timeline if EDR contains user-related information [age=35]

h) Use case "updating profile information using IP address": the user's IP address may be analyzed for, for example, geographical information, thereby showing if the visitor comes, for example, from an 'urban' area or from a 'non-urban' area. This data may be included in the user-related information.

Example of a rule: activate actions matching condition [location=urban] and modify respectively the timeline if EDR contains user-related information [location= . . . ].

i) Use case "updating profile information using psychological pattern detectors": user inputs via text as well as via the buttons "Applaud" or "Boo" is gathered and analyzed online by psychological pattern detectors (e.g. data mining algorithms detecting certain psychological characteristics of the users, e.g. by analyzing EDRs). Similar to a user's communication styles illustrated by way of non-limiting example in Table 1 above, the data received during interaction with a user may provide further inputs to user's personality. For example, in the case of the "presidential candidate" example, similar methods may be used to determine also political and social attributes in the user profile, e.g. if the user is an 'analytic person', 'emotional person', 'patriotic', and 'social', or combination thereof.

Example of filtering rule: activate action matching condition [user type=analytic person] and modify accordingly the timeline if EDR contains information [user type=analytic person].

Figure 7:
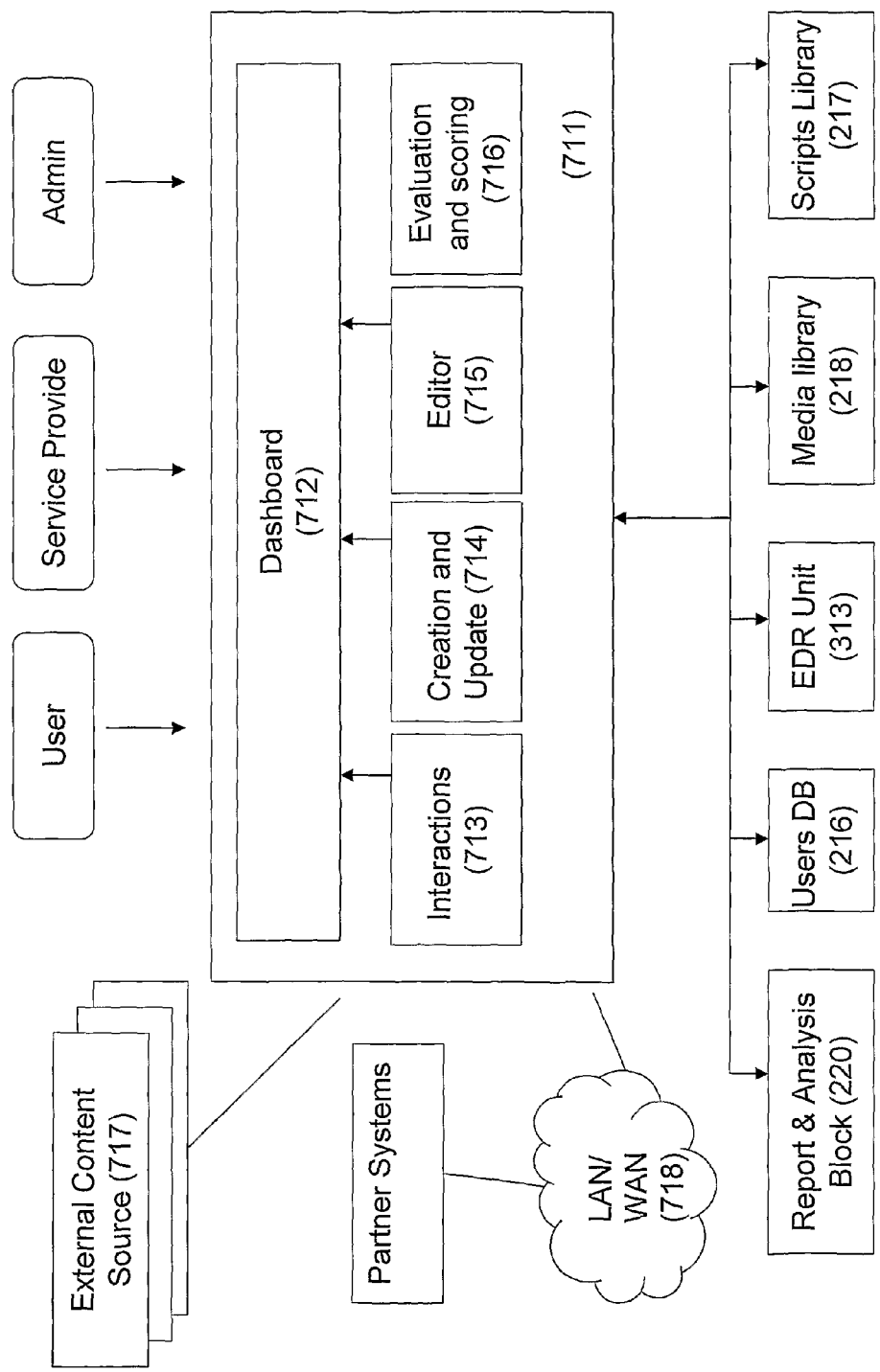
FIG. 7 illustrates a non-limiting example of a performance interface in accordance with certain embodiments of the present invention.

Referring to FIG. 7, there is illustrated a non-limited example of the performance interface. The performance interface is configured to facilitate input/output operations for one or more users and/or service providers and/or service administrators, etc. The performance interface may comprise at least one of the following blocks: an interaction block 713, a creation and updating block 714, an editor 715, a dashboard 712, an evaluation and scoring block 716.

The creation and updating block 714 is configured to enable copying elements from existing 'source' media and scripts libraries to the current performance's media and script library. Existing 'source' media and scripts libraries may be libraries of other performances made available through the network 718, and/or may be libraries built by content developers 717, and/or may be made available as a (paid) service from a service provider. Furthermore, a mechanism is made available to keep track of all the library copies across multiple degrees of separation from the original 'source' library, so that whenever the 'source' library is updated with new scripts or media, the updates are sent to all performances that are copied from these libraries, and with optional approval of the user, the updates are inserted into their own libraries. The block 714 is further configured to enable selection of the 'source' libraries to be copied, and is done using personality test (personality tests, emotional IQ tests, sensuality test, etc;) questionnaire filled by the user in the form of multiple choice questions and answers with dedicated scoring mechanism to calculate personality types or interests. The results enable to best choose the libraries to fit the user's personality, communication style and interests.

The creation and updating block 714 may be further configured to enable extracting information from available sources such as general information web sites, search engines, forums, Blogs, documents, XML feed, external database, and formatting these into a performance's media and scripts. A user may focus the extraction of information to certain areas of interest by selecting pre-defined actions, interest areas, or important keywords. A user may direct the extraction functions to certain information sources using a location identifier (e.g. URL), or he/she may or use default web sites destinations for specific topics of interest, or he/she may request the system to search the web for all relevant sources. The extraction function will then use pre-defined templates and actions to scan the source of information in search of a match. When a match is found, the associated templates and actions define the information to be extracted and the formatting of this information into media and scripts. The new media and scripts are, with optional approval of the user, inserted into the libraries. Building extraction templates and actions may be done by users, developers, or as a (paid) service by a service provider.

The dashboard 712 is configured to display usage and trends reports, access to interactions, evaluation and ranking of interactions, completeness score and tasks, etc.

Usage and trends reports are generated by the reports and analysis block 220 and will typically show how many personalized performances or interactions took place in the last 24 hours, last week, last 14 days, etc. It may further display for instance the top 5 most frequent inputs or questions, a list of inputs or questions for which there was no recognized input component i.e. unknown questions. Trends will further show how the usage evolved over different time periods, comparing usage indicators at different time periods.

The interactions block 713 is configured to enable users to review the interactions that took place with their performance. Reviewing a performance may be done by looking at the interaction across the timeline between the participating entities (people or systems), thereby seeing the media that was displayed in response to the inputs of the participants.

The evaluation and scoring block 716 is configured to generate evaluation and ranking of the interactions, and provide the result to the user/service provider (e.g. via the dashboard). Evaluation information is generated with scoring algorithms using visitor's profile information gathered from external sources or gathered during the interactions; e.g. the system will associate to a visitor "The system determined the visitor is: Male, 20-30 years old, looking for a date." Such evaluation may be enhanced by adding user created tests questions, or 3$^{rd}$ party created tests, to the media. These tests may be personality tests, astrology tests, emotional IQ tests, sensuality test, etc; in the form of multiple choice questions and answers with dedicated scoring mechanism to calculate personality types or interests. Visitors will provide answers to these questions as part of the performance, and the generated personality type will be added to the profile of the visitor; and further displayed as evaluation information; e.g. the system will associate to a visitor "The system determined the visitor is: Male, 20-30 years old, looking for a date, outgoing and fun, looking for a serious romantic relationship". Ranking will provide a score based on matching user's interests with the visitor's evaluation for areas such as socializing, business, or dating. Users will use ranking information to prioritize the interactions that will be reviewed.

The evaluation block 716 is configured to calculate a completeness score to indicate the quality of the personalized performance; and associates tasks for the user that will lead to a higher quality of the personalized performance and higher score. Tasks prioritize the work of the user in order to update the media and scripts libraries that will ensure the quality of personalized performances. The completeness score and tasks are generated based on several parameters; e.g. feedback of visitors, suggestions of visitors, and keywords appearing frequently in natural inputs without associated segment or input-code (hence indicating a lacking input-code in model according to Zipfs law), etc. Each task will be associated with a number by which the completeness score will increase if the task is done properly; e.g. "Your completeness score will be raised from 60% to 75% if you add media to answer the following question."

The editor 715 is configured to enable updating the performance's media and scripts. Updating a script element consists of editing and modifying the configuration of syntax, segment, mapping, rules, and/or actions of the system. The system displays a list of input components and associated rules and actions, similar to a Q&A or FAQ list. The user may edit an input component by adding, updating or deleting samples which are used by the system in evaluating the appropriate segments. The user may also add a new input component and associated samples. The user may edit and modify the rules associated with input components. The user may edit the media associated with the rules. Updating a media element consists of editing and modifying the text, HTML, XML, video file, image file, or audio file present in the media element. For this purpose, tools made available include HTML editors and user friendly graphical interfaces.

The user may, in addition, update media and scripts via the interactions block 713, e.g. while reviewing a performance by looking at the interaction across the timeline between the participating entities, thereby seeing the media that was displayed in response to the inputs of the participants; users will edit and modify the said media and or scripts associated with the inputs of the participants.

Certain aspects of the present invention may be implemented for different applications, providing, among others, advantages of personalized performance. The following non-limiting examples illustrate some of such applications:

a) Message positioning and persuasion applications in accordance with certain embodiments of the present invention enable to personalize performances of politicians, speakers, sales persons etc. and to adapt messages to the needs of a specific audience.

This application may be hosted on an Internet web site or mobile site, physical stand at public places, as well as specialized sites and websites, and the like.

b) Simulated teacher or professor performance, workshop and similar applications in accordance with certain embodiments of the present invention enable impression of a performance delivered in person with attending flexibility, ability to converse, personality, etc. The simulation may be of a real-life teacher, an actor, an animation, etc. The simulation may include video footage, multimedia and any other elements used as part of a real class. Furthermore, the solution generates statistics about most frequent queries and comments from users at different stages of the session. By analyzing the user responses at each stage of the session, the system provides feedback to the creator. The teacher can thereby improve the course based on new insight into the course's optimal structure, information depth required, student's understanding of the material, etc.

The system may present an "automatic ranking of comments"; which are the most frequently used inputs at each phase of the session, as default choices for the user. This makes it even easier for the user to interact with the system, since at each step he/she can choose to enter their own input or go with the most popular inputs.

c) Performance and business indicators analysis applications in accordance with certain embodiments of the present invention enable to produce key performance and business indicators to measure the efficiency of current messages, presentation, programs, trends, etc. based on data recorded in the system during interactive operation with different users. Furthermore, data mining on said data can be used for creating new stories and optimizing the messages and ways of presentation thereof.

d) Simulated tour guide, simulated hostess or concierge performance and similar applications enable to enrich the experience of the visitors, meaning that visitors may for instance get guidance through videos of a famous person or an actor playing the role of a historic figure and telling them about the places and activities that can be done, while at the same time giving the impression of this information being delivered in person with attending flexibility, ability to converse, personality, etc. In addition, based on visitors' input, the creator of the simulation can improve the content based on new insight into the tour's optimal flow, popularity of certain bits of content by visitors, and reactions thereto etc.

e) Self-introduction related applications may serve as an alternative way for a person to present oneself (e.g. instead of sending a classical resume or business card). The presentation generated in accordance with certain embodiments of the present invention enables to provide personal details and background information using prerecorded content (e.g. videos); while at the same time giving the impression of a performance delivered in person with attending flexibility, ability to converse, personality, etc. The presentation of the resume and/or business card may be interactively personalized in accordance with the needs and criteria of the contact person (e.g. underlining of specific skills, emotional level of presentation, etc.). The simulated resume, business card or alike may be an application hosted on a web site or mobile site, such as a company's web site, or as part of a (paid) service provided by a service provider, or as an attachment to an email, etc.

This application may be hosted as a physical stand in the lobby of a firm, hall of fame, employment agency, etc.

f) Computerized dating related applications enable a person to interactively present oneself to and verify the potential for a real contact or a real date. The presentation generated in accordance with certain embodiments of the present invention enables to provide personal details and background information using prerecorded content on various popular topics discussed during dates; while at the same time giving the impression of this information being delivered in person. The presentation may be interactively personalized in accordance with inputs by the contact person(s). Also, the presented person (or, for example, service provider) can review inputs and/or comments of the contact person(s), to update content to decide to contact the user directly for a real date, to score said inputs/comments in order to pre-select potential candidates for a date, etc. The application may be hosted on a web site or mobile site, such as a personal web site, or as part of a (paid) service provided by a service provider in the form of a dating or singles web site. This application may be hosted also as a physical stand at a café enabling virtual dates, at night clubs, or matchmaker agencies.

g) Interactive blog services and navigation applications enable to navigate through the content of a certain blog by posting comments and questions, and/or enable very large audiences to communicate with the blog's creator through the personalized performance. This is as an alternative to navigation of blogs using 'search' mechanism and keywords, or using hyperlinks. This is furthermore an alternative to communicating with the blog's creator using email or instant messaging. The simulation provides personal blog information using prerecorded content (e.g. videos, text, images); while at the same time giving the impression of a performance delivered in person with attending flexibility, ability to converse, personality, etc. Based on user's input, the creator of the blog can review comments of users, update certain content, etc.

h) Computerized Socializing and networking services related applications enable a person to express himself/herself and communicate with a large audience and verify the potential for a real contact. The presentation generated in accordance with certain embodiments of the present invention enables to provide personal details and background information using prerecorded content on various topics for self-expression and socialization; while at the same time giving the impression of this information being delivered in person. The application may be hosted on a web site or mobile site, such as a personal web site, or as part of a (paid) service provided by a service provider in the form of a social web site.

It is to be understood that the invention is not limited in its application to the details set forth in the description contained herein or illustrated in the drawings. The invention is capable of other embodiments and of being practiced and carried out in various ways. It should be noted that the invention is not bound by the specific algorithm of processing or specific structure. Those versed in the art will readily appreciate that the invention is, likewise, applicable to any other processing or presentation with equivalent and/or modified functionality which may be consolidated or divided in another manner.

It will also be understood that the invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A computer for use in a system capable of providing a personalized performance of at least one story having a predefined timeline, the computer comprising;

an input analysis unit operatively coupled to an event details records unit, said computer is configured to support at least one user interface configured to receive the one or more inputs from one or more users, said input analysis unit is configured to parse the one or more received user inputs, to recognize one or more components comprised in said inputs, thus giving rise to actual input components, and to match said actual input components to predefined input components, and said event details records unit is configured to accommodate one or more event detail records comprising at least data related to matching between actual and predefined input components and received from the input analysis unit; and wherein said computer is further configured to modify the predefined story timeline in accordance with a result of processing said one or more event detail records, to generate a performance in accordance with the modified story timeline; and to facilitate providing said generated performance via the user interface.

2. The computer of claim 1 wherein the user interface is operatively associated with a communication device having input and output capabilities and capable to communicate with the computer.

3. The computer of claim 1 configured to provide the personalized performance as a service or part thereof provided by a service provider.

4. The computer of claim 1 further comprising a performance interface configured to facilitate an interaction with a service provider.

5. The computer of claim 4 wherein the interaction with a service provider comprises obtaining from the service provider one or more media items, scripts and/or story boards personalized for a certain user and/or user group.

6. The computer of claim 1 further comprising a user database with information related to one or more users and/or users' group, said information related to at least one subject selected from a group comprising: general personal information, demographic details, user profile, personal preferences, mood at certain time, attitude at certain time, historical information, statistical information.

7. The computer of claim 6 further configured to analyze inputs received from a certain user in respect to certain timeline, define one or more indicators of user's communication style and/or one or more attributes characterizing user's personality, and to update the user database accordingly.

8. The computer of claim 6 further configured to modify the predefined timeline for a certain user in accordance with information comprised in the user database and related to said user.

9. The computer of claim 1 further comprising a media library containing one or more media items to be used when generating the performance of the story.

10. The computer of claim 1 further comprising a scripts library containing at least one or more scripts and/or one or more story boards related to one or more episodes of one or more stories.

11. The computer of claim 10 further configured to modify at least one script or story board based on data previously obtained during interacting with one or more users.

12. The computer of claim 1 further comprising a components library comprising a set of predefined input components.

13. The computer of claim 12 further configured to modify the set of predefined input components based on data previously obtained during interacting with one or more users.

14. The computer of claim 1 wherein the event details records further comprise a context information related to a position in the story timeline, media item currently presented to the user and/or currently activated script/story.

15. The computer of claim 1 further comprising a controller unit operatively coupled with the events details records unit and configured to process said events details records and to select one or more actions if a result of said processing matches a predefined criterion.

16. The computer of claim 15 further comprising an output manager configured to communicate with the controller unit and to enable generating the performance in accordance with one or more actions selected by the controller unit and communicated to the output manager.

17. The computer of claim 16 further comprising a counter unit operatively coupled to the output manager and to the event details records unit, and configured to keep counters on the usage of certain media items by the output manager and to provide this data or derivatives thereof to the event details records unit.

18. The computer of claim 16 further comprising a context unit operatively coupled to the output manager and to the event details records unit, and configured to extract context data related to the performance and provide this data or derivatives thereof to the event details records unit.

19. The computer of claim 15, wherein at least one action is selected from a group comprising story timeline related actions, user related actions and operation related actions.

20. The computer of claim 1 wherein the received user's inputs comprise at least one input selected from a group comprising: (a) text input; (b) audio input; (c) video input; (d) speech input; (e) image input; (f) information related to predefined elements of the user interface; (g) mood characteristics; (h) attitude characteristics.

21. The computer of claim 1 wherein the provided performance comprises at least one output selected from a group comprising: (a) text output; (b) audio output; (c) video output; (d) speech output; (e) image output.

22. Use of the computer of claim 1 for at least one application selected from a group comprising: (a) personalized presentation; (b) message positioning and persuasion application; (e) simulated teacher performance application; (d) performance and business indicators analysis application; (e) simulated tour guide application; (f) simulated hostess application; (g) self-introduction related application; (h) dating services related application; (i) blog service and navigation application; (j) social and networking service application; (k) public relations and promotional services application; (l) entertainment application; (m) medical and health care services application; (n) customer support services application.

23. A method of operating a computerized system capable of providing a personalized performance of a story having a predefined timeline stored in a memory of a computer, the method comprising:
 (a) receiving one or more inputs from one or more users;
 (b) using the computer for analyzing at least said received inputs in order to recognize one or more components comprised in said inputs thus giving rise to actual input components;
 (c) using the computer for matching said actual input components to a set of predefined input components;
 (d) accommodating in the memory of the computer one or more event detail records comprising at least data related to matching between actual and predefined input components;
 (e) using the computer for processing said accommodated event detail records
 (f) using the computer for modifying the story timeline in accordance with results of said processing; and
 (g) using the computer for generating the performance in accordance with the modified story timeline.

24. The method of claim 23 wherein the inputs received from one or more users are substantially concurrent.

25. The method of claim 23 wherein the recognition is provided by segmenting the received inputs and matching the resulting segments to one or more predefined potential components, thus giving rise to the actual input components being result of a positive match.

26. The method of claim 25 wherein at least one potential component among the predefined potential components is configured to provide a positive match with two or more segments.

27. The method of claim 23 further comprising
 receiving data related to at least one element of the group comprising user profile, operational session and story context, and recording said data in the event details record in appropriate fields;
 wherein at least one of said appropriate fields is included in the processing of the event details record.

28. The method of claim 23 wherein processing the accommodated event details detail records further comprises processing data selected from the group comprising: (a) data related to user inputs and/or derivatives thereof; (b) user-related information; (c) context-related data comprising position in the story timeline, media item currently presented to the user and/or currently activated script/story.

29. The method of claim 23 wherein the personalized performance is provided as a service provider's service or part thereof.

30. The method of claim 29 wherein the interaction with service provider comprises obtaining from the service provider one or more media items, scripts and/or story boards personalized for a certain user and/or user group.

31. The method of claim 23 further comprising an interaction with a service provider.

32. The method of claim 23 further comprising:
 (a) analyzing inputs received from a certain user in respect to certain timeline;
 (b) defining one or more indicators of a user's communication style and/or one or more attributes characterizing user's personality; and
 (c) modifying said certain timeline in accordance with results of operation (b).

33. The method of claim 23 further comprising obtaining information related to a certain user and/or user's group, said information related to at least one subject selected from a group comprising: general personal information, demographic details, user profile, personal preferences, mood at certain time, attitude at certain time, historical information, and statistical information, and modifying the timeline for a certain user in accordance with said information.

34. The method of claim 23 further comprising modifying at least one predefined input component based on data previously obtained during interacting with one or more users.

35. The method of claim 23 wherein the received user's inputs comprise at least one input selected from a group comprising: (a) text input; (b) audio input; (c) video input; (d) speech input; (e) image input; (f) information related to predefined elements of the user interface; (g) mood characteristics; (h) attitude characteristics.

36. The method of claim 23 wherein the provided performance comprises at least one output selected from a group comprising: (a) text output; (b) audio output; (c) video output; (d) speech output; (e) image output.

37. Use of the method of claim 23 for at least one application selected from a group comprising: (a) personalized presentation; (b) message positioning and persuasion application; (c) simulated teacher performance application; (d) performance and business indicators analysis application; (e) simulated tour guide application; (f) simulated hostess application; (g) self-introduction related application; (h) dating services related application; (i) blog service and navigation application; (j) social and networking service application; (k) public relations and promotional services application; (l) entertainment application; (m) medical and health care services application; (n) customer support services application.

38. The method of claim 23 further comprising recording data related, at least, to user inputs in connection with corresponding context, defining one or more inputs frequently used in respect to a certain context, and configuring a default selection within respective context in accordance with said defined inputs.

39. The method of claim 23 further comprising recording data related, at least, to user inputs in connection with corresponding context, and analyzing said data in order to provide one or more indicators of efficiency of the persuasion during the performance.

40. A program storage device readable by machine, tangibly embodying a program of instructions executable by the machine to perform method steps of operating a system capable of a personalized performance of a story having a predefined timeline, the method comprising:
 (a) receiving one or more inputs from one or more users;
 (b) analyzing at least said received inputs in order to recognize one or more components comprised in said inputs thus giving rise to actual input components;
 (c) matching said actual input components to a set of predefined input components;
 (d) accommodating one or more event detail records comprising at least data related to matching between actual and predefined input components;
 (e) processing said accommodated event detail records;
 (f) modifying the story timeline in accordance with results of said processing;
 (g) generating the performance in accordance with the modified story timeline.

41. A computer program product comprising a computer usable non-transitory medium having computer readable program code embodied therein of operating a system capable of a personalized performance of a story having a predefined timeline, the computer program product comprising:
 (a) computer readable program code for causing the computer to receive one or more inputs from one or more users;
 (b) computer readable program code for causing the computer to analyze at least said received inputs in order to recognize one or more components comprised in said inputs thus giving rise to actual input components;
 (c) computer readable program code for causing the computer to match said actual input components to a set of predefined input components;
 (d) computer readable code for causing the computer to accommodate one or more event detail records comprising at least data related to matching between actual and predefined input components;
 (e) computer readable program code for causing the computer to process said accommodated event detail records;
 (f) computer readable program code for causing the computer to modify the story timeline in accordance with results of said processing;
 (g) computer readable program code for causing the computer to generate the performance in accordance with the modified story timeline.

\* \* \* \* \*